United States Patent
Shiota (10) Patent No.: US 7,489,047 B2
(45) Date of Patent: Feb. 10, 2009

(54) ELECTRIC POWER GENERATING APPARATUS FOR DECENTRALIZED POWER SUPPLY

(75) Inventor: Takashi Shiota, Yokohama (JP)

(73) Assignee: Toyo Electric Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/574,700

(22) PCT Filed: Oct. 1, 2004

(86) PCT No.: PCT/JP2004/014512

§ 371 (c)(1),
(2), (4) Date: Apr. 3, 2006

(87) PCT Pub. No.: WO2005/034334

PCT Pub. Date: Apr. 14, 2005

(65) Prior Publication Data

US 2007/0040386 A1      Feb. 22, 2007

(30) Foreign Application Priority Data

Oct. 2, 2003    (JP)   ............................ 2003-344186

(51) Int. Cl.
*F03D 9/00* (2006.01)
*H02P 9/04* (2006.01)
(52) U.S. Cl. ........................................................ 290/44
(58) Field of Classification Search .................... 290/44
See application file for complete search history.

(56) References Cited

U.S. PATENT DOCUMENTS 1,965,439 A * 7/1934 Stoller .......................... 363/76

(Continued)

FOREIGN PATENT DOCUMENTS

CN      2575897 Y     9/2003

(Continued)

OTHER PUBLICATIONS

The Naturaly Saturated Reactor with Parallel Excitation: Operational Behavior; 2001 IEEE Porto Power Tech Conference; 6 pages; http://ieeexplore.ieee.org/iel5/7632/20827/00964866.pdf.*

(Continued)

*Primary Examiner*—Nicholas Ponomarenko
*Assistant Examiner*—Pedro J Cuevas
(74) *Attorney, Agent, or Firm*—Chapman and Cutler LLP (57) ABSTRACT

An electric power generating apparatus (2) for decentralized power supply, which comprises three types of windings and three types of reactors required for deriving the maximum output that meets a wind velocity or a flow velocity to obtain a DC output, has problems that many reactors are required and the winding structure of the permanent magnet type of electric power generator (3) is complicated, so that the number of manufacture processes is large and the cost is high. An electric power generating apparatus for decentralized power supply, which rectifies an AC output of a permanent magnet type of electric power generator driven by a windmill or a waterwheel to provide a DC output, wherein the permanent magnet type of electric power generator comprises two types of windings inducing different voltages, and wherein an AC output from one of the two types of windings exhibiting a higher induced voltage is rectified through a series connected saturated reactor, while an AC output from the other of the two types of windings exhibiting a lower induced voltage is rectified as it is, and the rectification outputs are connected in parallel.

20 Claims, 5 Drawing Sheets

U.S. PATENT DOCUMENTS

| | | | | |
|---|---|---|---|---|
| 2,000,189 | A * | 5/1935 | Power | 363/76 |
| 2,041,643 | A * | 5/1936 | Huet | 323/259 |
| 2,068,316 | A * | 1/1937 | Farkas | 323/208 |
| 2,175,379 | A * | 10/1939 | Dellenbaugh, Jr. | 363/93 |
| 2,367,625 | A * | 1/1945 | Short | 307/151 |
| 2,461,964 | A * | 2/1949 | Crever | 322/24 |
| 2,697,794 | A * | 12/1954 | Jaeschke | 310/95 |
| 2,820,190 | A * | 1/1958 | Kesselring | 363/106 |
| 2,860,301 | A * | 11/1958 | Diebold | 363/106 |
| 2,868,877 | A * | 1/1959 | Hooper, Jr. et al. | 381/120 |
| 2,886,719 | A * | 5/1959 | Bohn | 307/108 |
| 3,042,836 | A * | 7/1962 | Hamilton et al. | 361/240 |
| 3,123,761 | A * | 3/1964 | Greene | 363/92 |
| 3,320,509 | A * | 5/1967 | Guglielmi | 320/123 |
| 3,324,350 | A * | 6/1967 | Segall et al. | 315/209 CD |
| 3,483,463 | A * | 12/1969 | Smith | 322/29 |
| 3,703,610 | A * | 11/1972 | Ebbe et al. | 379/177 |
| 4,036,916 | A * | 7/1977 | Agsten | 361/109 |
| 4,058,761 | A * | 11/1977 | Friedlander | 323/232 |
| 4,112,403 | A * | 9/1978 | Friedlander | 336/12 |
| 4,210,860 | A * | 7/1980 | Rosa et al. | 323/210 |
| 4,340,822 | A * | 7/1982 | Gregg | 290/55 |
| 4,560,884 | A * | 12/1985 | Whittecar | 290/42 |
| 4,746,808 | A * | 5/1988 | Kaeser | 290/52 |
| 4,818,892 | A * | 4/1989 | Oohashi et al. | 307/106 |
| 4,963,780 | A * | 10/1990 | Hochstrasser | 310/104 |
| 5,054,029 | A * | 10/1991 | Sugawara et al. | 372/38.04 |
| 5,203,672 | A * | 4/1993 | Wolf | 415/2.1 |
| 5,521,810 | A * | 5/1996 | Yamaguchi et al. | 363/91 |
| 5,783,894 | A * | 7/1998 | Wither | 310/266 |
| 6,097,104 | A * | 8/2000 | Russell | 290/54 |
| 6,172,429 | B1 * | 1/2001 | Russell | 290/54 |
| 6,227,803 | B1 * | 5/2001 | Shim | 416/44 |
| 6,583,532 | B2 * | 6/2003 | Hein et al. | 310/260 |
| 6,594,292 | B2 * | 7/2003 | Kawasuji et al. | 372/38.02 |
| 6,611,437 | B2 * | 8/2003 | Kawazoe et al. | 363/37 |
| 6,611,438 | B2 * | 8/2003 | Kawazoe et al. | 363/37 |
| 6,731,522 | B2 * | 5/2004 | Kawazoe et al. | 363/37 |
| 7,042,109 | B2 * | 5/2006 | Gabrys | 290/44 |
| 7,071,579 | B2 * | 7/2006 | Erdman et al. | 290/55 |
| 7,126,235 | B2 * | 10/2006 | Bernhoff et al. | 290/44 |
| 2002/0158538 | A1 * | 10/2002 | Herda et al. | 310/184 |
| 2003/0007368 | A1 * | 1/2003 | Kawazoe et al. | 363/34 |
| 2003/0007371 | A1 * | 1/2003 | Kawazoe et al. | 363/37 |
| 2003/0214823 | A1 * | 11/2003 | Kawazoe et al. | 363/37 |
| 2003/0227172 | A1 * | 12/2003 | Erdman et al. | 290/44 |
| 2004/0041409 | A1 * | 3/2004 | Gabrys | 290/55 |
| 2004/0046530 | A1 * | 3/2004 | Hessling | 322/29 |
| 2005/0151376 | A1 * | 7/2005 | Bernhoff et al. | 290/44 |

FOREIGN PATENT DOCUMENTS

| | | | |
|---|---|---|---|
| DE | 19804693 | A1 | 8/1999 |
| JP | 39-25502 | Y1 | 9/1964 |
| JP | 2-17900 | A | 1/1990 |
| JP | 02-046150 | | 2/1990 |
| JP | 2-46150 | A | 2/1990 |
| JP | 2000345952 | A * | 12/2000 |
| JP | 2002339856 | A * | 11/2002 |
| JP | 2004064928 | A * | 2/2004 |
| JP | 2006238539 | A * | 9/2006 |
| WO | WO 99/40677 | | 12/1999 |

OTHER PUBLICATIONS

Icreasing The Capacity of Long EHV Transmision Lined by Saturated Reactors; 14th PSCC, Sevilla, Jun. 24-28, 2002; 6 pages; http://www.eeh.ee.ethz.ch/pscc02/papers/s35p04.pdf.*

International Search Report: Application No. PCT/JP2004/014512 Jan. 25, 2005 : ISA/Japanese Patent Office.

Chinese Patent Office, First Office Action in Chinese Patent Application No. 2004800357244, issued Dec. 28, 2007, Chinese Patent Office, China.

* cited by examiner

ELECTRIC POWER GENERATING APPARATUS FOR DECENTRALIZED POWER SUPPLY

TECHNICAL FIELD

The present invention relates to an electric power generating apparatus for dispersed power supply for taking substantially maximum output from wind or water through an electric power generator driven by a windmill or waterwheel irrespective of wind speed or flow velocity.

BACKGROUND ART

Figure 1:
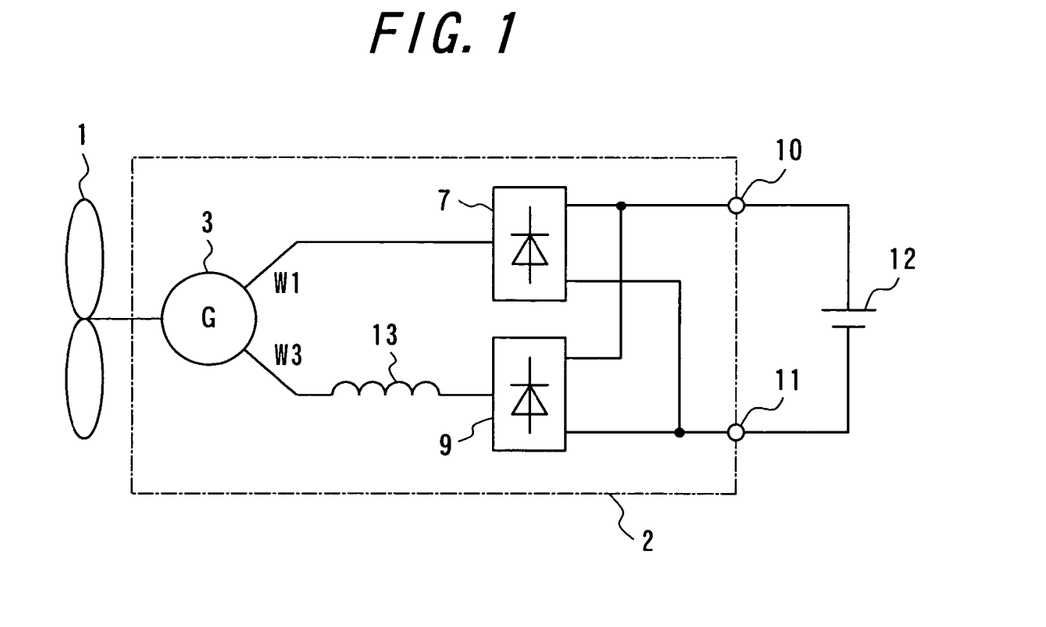
FIG. 1 is a single-line diagram of the main circuit of the electric power generating apparatus for dispersed power supply applied to a windmill according to the first embodiment of the invention.

In order to take substantially maximum output from a permanent magnet type electric power generator connected to a windmill or waterwheel by converting alternating current to direct current without using a PWM (Pulse Width Modulation) converter, the applicant of the present application had proposed an electric power generating apparatus for dispersed power supply comprising a permanent magnet type electric power generator including a plurality of windings producing different induced voltages, respectively, and having output terminals each connected in series through a reactor to a rectifier, and the direct current outputs of these rectifiers being connected in parallel to one another, thereby outputting the direct current to the external (refer to, for example, Patent Literature 1, Japanese Patent Application 2002-221,714, FIG. 1).

Such an apparatus of the prior art will be explained with reference to a single-line diagram of the main circuit illustrating a small size wind power generating apparatus connected to a windmill shown in FIG. 9.

Figure 9:
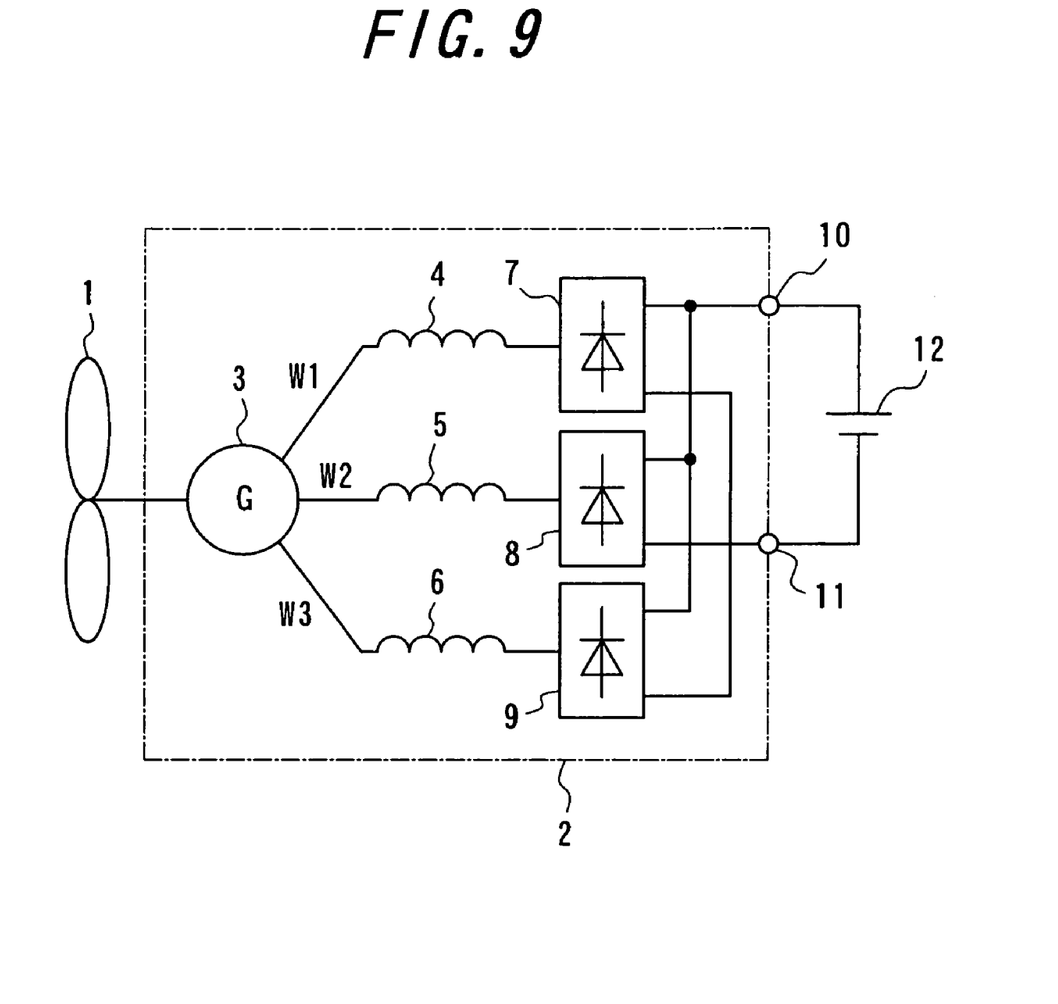
FIG. 9 is a single-line diagram of the main circuit of the small size wind power generating apparatus of the prior art.

In FIG. 9, a windmill is denoted by reference numeral 1 and the small size wind power generating apparatus of the prior art is denoted by numeral 2 comprising a permanent magnet type electric power generator 3, first to third reactors 4 to 6, first to third rectifiers 7 to 9, a positive output terminal 10, and a negative output terminal 11, and a battery 12.

The permanent magnet type electric power generator 3 includes three windings insulated and different in induced voltage. The first winding W1 among them produces the lowest induced voltage because of the least number of turns and is connected to the first reactor 4 and further to the first rectifier 7. The second winding W2 whose number of turns is larger than that of the first winding W1 but less than the third winding W3 is connected to the second reactor 5 and further to the second rectifier 8.

The third winding W3 produces the highest induced voltage because of the largest number of turns and is connected to the third reactor 6 and further to the third rectifier 9.

The direct current outputs of each of the first to third rectifiers 7 to 9 are connected to the positive output terminal 10 and the negative output terminal 11 in parallel respectively, and the total output of the respective windings is input to the battery 12.

A method for obtaining the substantially maximum output from the windmill by means of the electric power generating apparatus 2 for dispersed power supply thus configured will be described hereinafter.

Figure 8:
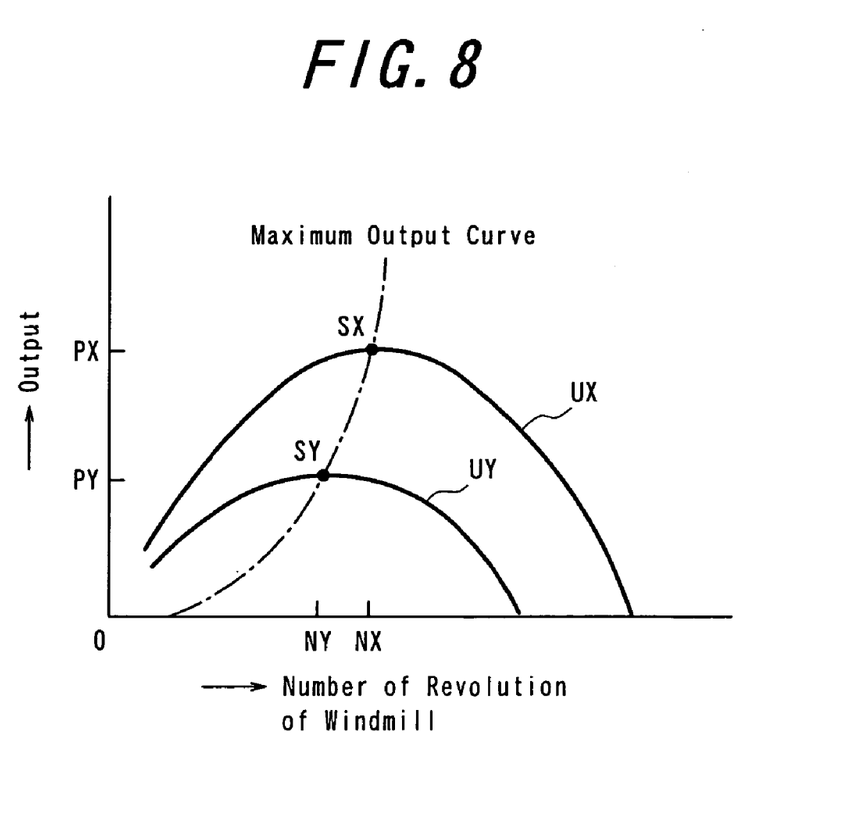
FIG. 8 is a view for explaining outline of the number of revolutions to output characteristic of a windmill with wind speeds as a parameter.

FIG. 8 is a diagram for explaining the outline of the number of revolutions of the windmill to output characteristic when wind speed is a parameter.

With a windmill, if the shape of the windmill and wind speed U are determined, the output P of the windmill is primarily determined with respect to the number of revolutions N of the windmill. For example, the outputs P of the windmill for the wind speeds UX and UY are illustrated in solid lines in FIG. 8, respectively. Peak values of the outputs P of the windmill for various wind speeds are shown in a dot-and-dash line as a maximum output curve in FIG. 8.

In more detail, with the number of revolutions of the windmill to output characteristic in FIG. 8, when the wind speed is UX, the maximum output PX of the windmill is obtained at the number of revolutions NX of the windmill as shown at the intersection point SX of the windmill output curve with the maximum output curve.

Moreover, when the wind speed is UY, the maximum output PY of the windmill is obtained at the number of revolutions NY of the windmill.

Namely, when viewed the maximum output curve in FIG. 8 from another standpoint, this curve indicates the fact that in order to obtain the maximum output from the wind, upon the number of revolutions N of the windmill being determined, the maximum output can be obtained by primarily determining the output P of the permanent magnet type electric power generator at a value on the maximum output curve.

Figure 7:
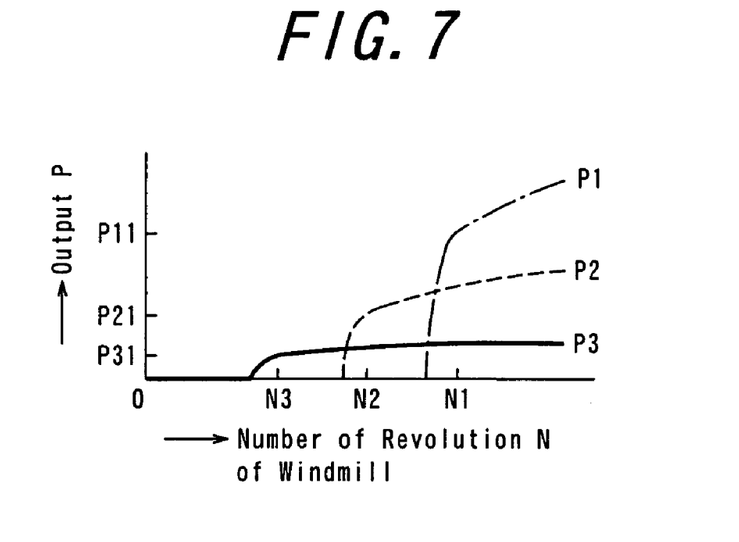
FIG. 7 is the number of revolutions to output characteristic diagram of the respective windings of the small size wind power generating apparatus of the prior art.

FIG. 7 is an explanatory view when the direct current outputs of the small size wind power generating apparatus 2 of the prior art are connected to a constant-voltage power supply such as a battery or the like. As shown in FIG. 7, respective outputs of the first to third windings W1 to W3 in the permanent magnet type electric power generator 3 of the small size wind power generating apparatus 2 are shown as the number of revolutions of windmill to output characteristic curves P1 to P3 for the respective windings in FIG. 7, owing to difference in induced voltages of the windings and voltage drops caused by internal inductances of the respective windings and the reactors connected to the outputs of the respective windings.

In other words, when the number of revolutions N of the windmill is low, the battery is not charged because the produced voltage V3 of the third winding W3 is lower than the battery voltage Vb. However, when the number of revolutions N of the windmill increases to a value near to N3, the electric current starts to flow. When the number of revolutions N of the windmill attains N3, the output P3 of the third winding W3 becomes P31. Even if the number of revolutions N of the windmill increases so as to exceed N3 to increase the induced voltage, the voltage Vb of the battery will remain at substantially constant value so that the output P3 remains at a slightly higher value than P31, because the impedance owing to inductances and other effect of the third winding W3 and the third reactor is proportional to the frequency.

With the second winding W2, the induced voltage is raised with a further increase in number of revolutions N to start obtaining the output which is large output because the internal inductance and the like may be small. With the first winding W1, even larger output can be obtained when the number of revolutions N is further increased.

Figure 6:
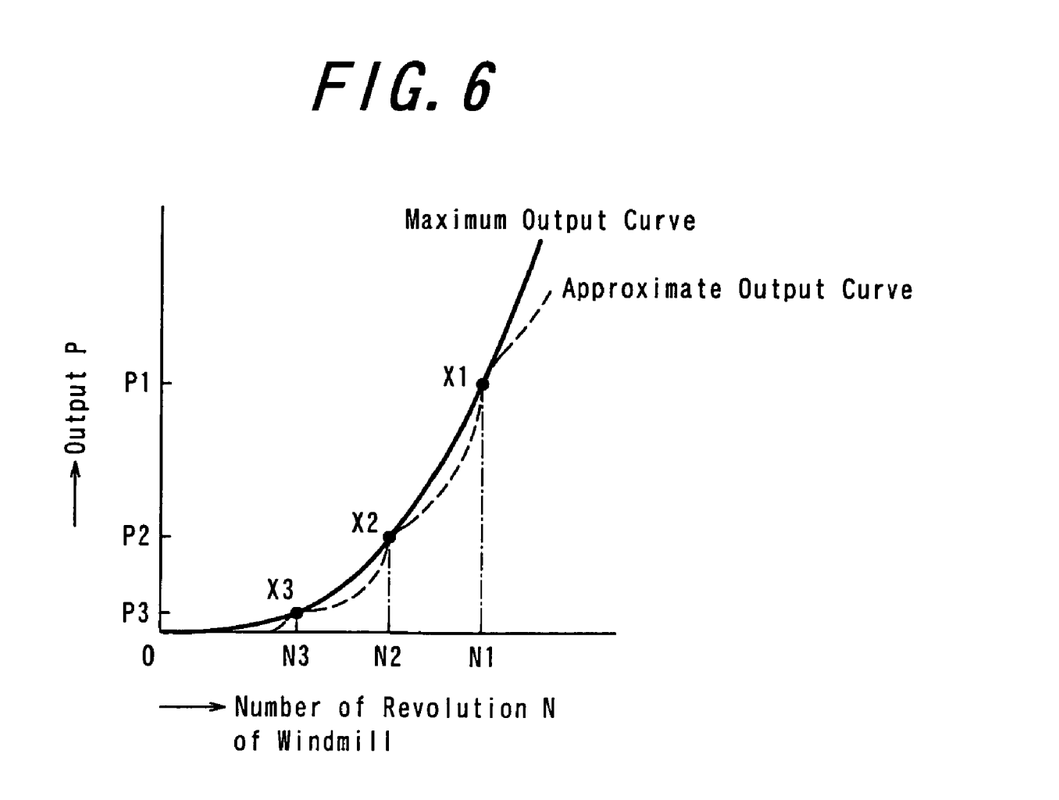
FIG. 6 is the number of revolutions to windmill output characteristic diagram of the small size wind power generating apparatus of the prior art.

With the small size wind power generating apparatus 2 thus constructed, the output to the constant-voltage power supply such as the battery 12 or the like is equal to the total output obtained by summing up the outputs P1 to P3 of the first to third windings and illustrated by approximate output curves as shown in broken lines in FIG. 6. As shown in FIG. 6, therefore, this total output realizes approximate output curves relative to the maximum output curve shown in a solid line in FIG. 6.

DISCLOSURE OF THE INVENTION

Task to be Solved by the Invention

The small size wind power generating apparatus 2 of the prior art including the three kinds of windings and three kinds of reactors described above suffers problems to be solved from the fact that many reactors are required, and the windings in the permanent magnet type electric power generator 3 are complicated in configuration, making the production process lengthy, in terms of the number of step involved, and potentially costly.

Solution for the Task

In view of the above circumstances, the present invention will provide an improved electric power generating apparatus for dispersed power supply comprising reduced kinds of windings in a permanent magnet type electric power generator 3 and employing a saturated reactor as a reactor to be connected to the external for obtaining substantially the maximum output from a windmill or waterwheel.

Effects of the Invention

The electric power generating apparatus 2 for dispersed power supply according to the invention includes the permanent magnet type electric power generator 3 having the reduced kinds of windings and the reduced number of reactor so that production steps can be reduced to decrease the manufacturing cost.

BEST MODE FOR CARRYING OUT THE INVENTION

The electric power generating apparatus for dispersed power supply according to the invention comprises a permanent magnet type electric power generator 3 including two kinds of windings different in induced voltage, only one of the windings producing the higher induced voltage being connected to a reactor which is a saturated reactor.

First Embodiment

FIG. 1 is a single line diagram of the main circuit of the electric power generating apparatus for dispersed power supply driven by a windmill according to the invention.

In FIG. 1, the electric power generating apparatus is denoted by reference numeral 2 and comprises a permanent magnet type electric power generator 3, a saturated reactor 13, first and third rectifiers 7 and 9, a positive output terminal 10 and a negative output terminal 11. The same components are identified by the same reference numerals used in FIG. 9.

One embodiment of the invention will be explained with reference to FIG. 1 hereinafter.

The electric power generating apparatus 2 for dispersed power supply according to the invention comprises the permanent magnet type electric power generator including two insulated windings different in number of turns, one of which is the winding W1 producing a lower induced voltage and connected to the first rectifier 7.

The other winding W3 produces a higher induced voltage and is connected to the saturated reactor 13 and further to the third rectifier 9.

The direct current outputs of each of the first and third rectifiers 7 and 9 are connected to the positive output terminal 10 and the negative output terminal 11, respectively, and further to a battery 12.

Figure 5:
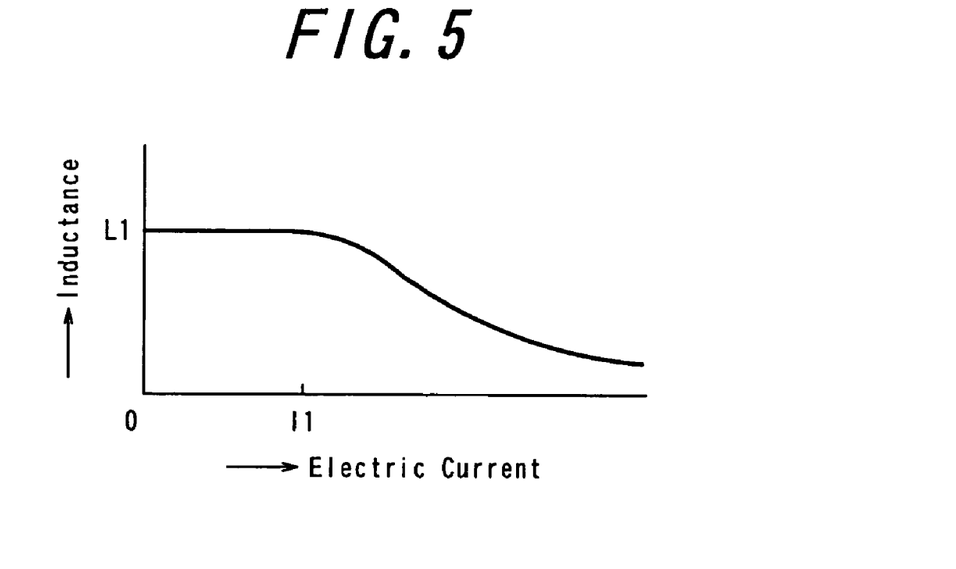
FIG. 5 is a view for explaining the inductance of the saturated reactor according to the invention.

The employed saturated reactor 13 has an electric current to inductance characteristic that the core forming the reactor is saturated as the electric current is increased so that the inductance value reduces as shown in FIG. 5 illustrating the electric current to inductance characteristic of the saturated reactor. As shown in FIG. 5, the saturated reactor has the characteristic that when the electric current is I1, the inductance is L1, but the inductance reduces within the range of the electric current of more than I1.

Such a saturated reactor can be realized by appropriately determining sizes of the core and gaps and the numbers of turns.

In the electric power generating apparatus 2 for dispersed power supply in FIG. 1, consequently, the saturated reactor 13 is employed as a reactor connected to the winding W3, in order to eliminate the winding W2 and the reactor 5 of the small size wind power generating apparatus 2 in FIG. 9.

A method for taking the maximum output primarily determined depending upon the shape of a windmill at various wind speeds from the electric power generating apparatus 2 for dispersed power supply thus constructed will be explained with reference to FIG. 3 of the number of revolutions to output characteristic diagram of the electric power generating apparatus for dispersed power supply according to the invention and FIG. 4 of the number of revolutions to output characteristic diagram of each winding of the electric power generating apparatus for dispersed power supply according to the invention.

Figure 4:
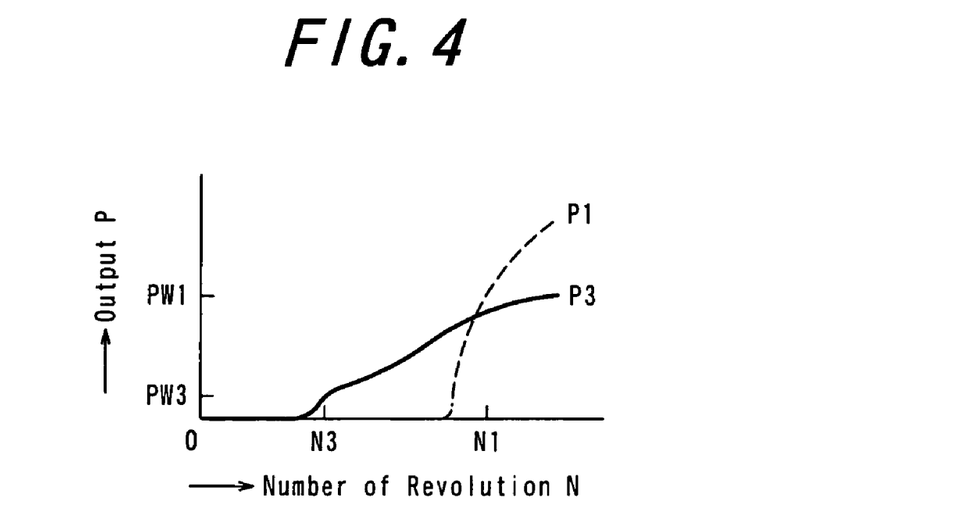
FIG. 4 is the number of revolutions to output characteristic diagram of respective windings of the electric power generating apparatus for dispersed power supply of the first embodiment of the invention.

In the number of revolutions to output characteristic diagram of each winding of the electric power generating apparatus for dispersed power supply according to the invention of FIG. 4, the output P3 of the winding W3 increases along a curve which is curved more rapidly toward the upper right because connected to the saturated reactor is the winding W3 whose inductance value reduces with an increase in electric current. Such an increase of the output P3 of the winding W3 differs clearly from that of the third winding W3 connected to the reactor of the constant inductance value as is the case with the prior art apparatus in FIG. 9.

The output characteristic of the winding W3 according to the illustrated embodiment of the invention depends upon the internal inductance value of the winding W3 in the permanent magnet type generator 3 which is not varied by the number of revolutions, induced voltage and electric current value and upon the inductance value of the saturated reactor 13.

Figure 3:
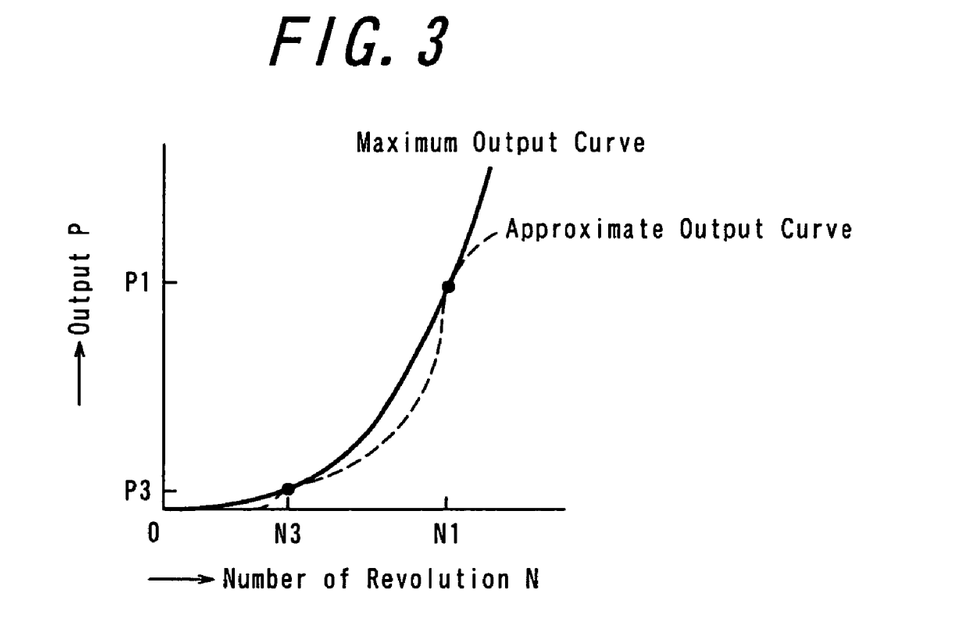
FIG. 3 is the number of revolutions to windmill output characteristic diagram of the electric power generating apparatus for dispersed power supply of the first embodiment of the invention.

The output to the constant-voltage power supply such as the battery 12 or the like by the small size wind power generating apparatus 2 thus constructed is equal to the total output obtained by summing up the outputs P1 and P3 of the windings W1 and W3 and indicated by an approximate output curve shown in a dashed line in FIG. 3. As shown in FIG. 3, therefore, this total output achieves an approximate curve of the maximum output curve shown in a solid line.

According to the invention, it is possible to cause the approximate curve to be closer to the maximum output curve shown in FIG. 3 so as to take the energy from the wind as much as possible by adjusting the induced voltage values and the internal inductance values of the respective windings W1 and W3 of the permanent magnet type electric power generator 3, and the inductance value of the saturated reactor 13.

In more detail, although the maximum output curve in FIG. 3 is a cubic curve in relation to the number of revolutions of the windmill, the voltage drop owing to the internal inductance of each of the plurality of windings and the reactor is proportional to the number of revolutions of the windmill. Moreover, although the induced voltage of each of the plurality of windings is proportional to the number of turns of the winding, the internal inductance is proportional to the square of the number of turns. The apparatus may be designed in consideration of these facts.

In the embodiment of the invention described above, with the permanent magnet type electric power generator 3 constructing the electric power generating apparatus 2 for dispersed power supply, the respective windings have different numbers of turns for producing different induced voltages and outputs, while the cross-sectional area of the winding W1 permitting a greater amount of electric current to pass therethrough is larger than that of the winding W3.

With the permanent magnet type electric power generator 3, moreover, the internal windings may be configured so as to produce different induced voltages and outputs. It is not necessary to receive windings different in number of turns into the same stator slots.

Moreover, the electric power generating apparatus 2 for dispersed power supply according to the invention may be applicable to those of the number of phase other than the three phases.

It has been described the case that the constant-voltage power supply such as the battery 12 or the like is charged by the electric power generating apparatus for dispersed power supply according to the invention. When the direct-current voltage is raised by charging, if the charging is continued under the condition of the rising direct-current voltage, the approximate output curve of the small size wind power generating apparatus as shown in FIG. 3 may be dissociated toward the right hand away from the maximum output curve so that the output is reduced. Such a rising direct-current voltage results from the fact that the charging to the constant-voltage power supply such as the battery 12 or the like has sufficiently been effected by the wind power generation. Therefore, this phenomenon is not problematic for the entire system including the constant-voltage power supply such as the battery 12 or the like. If the direct-current voltage tends to further increase in a system, the constant-voltage power supply such as the battery 12 or the like may be disconnected from the system, or the windmill may be stopped.

In the case that the direct current voltage varies depending upon the amount of the charged current, this problem can be solved by designing the numbers of windings and the saturated reactor such that the approximate output curve is caused to be close to the maximum output curve of the electric power generating apparatus for dispersed power supply to the fullest extent.

Second Embodiment

Figure 2:
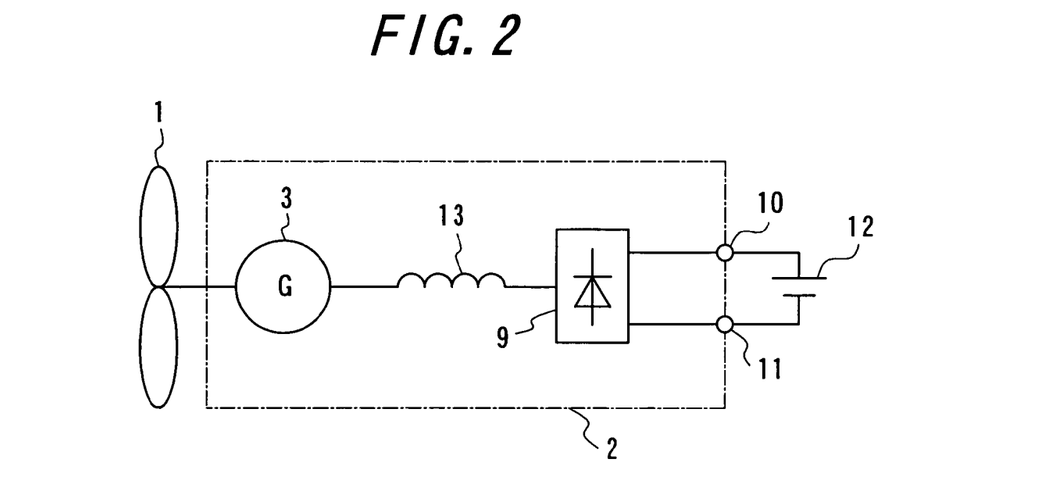
FIG. 2 is a single-line diagram of the main circuit of the electric power generating apparatus for dispersed power supply applied to a windmill according to the second embodiment of the invention.

FIG. 2 illustrates second embodiment of the invention.

In FIG. 2, an electric power generating apparatus 2 for dispersed power supply of the second embodiment comprises a permanent magnet type electric power generator 3, a saturated reactor 13, a rectifier 9, and a battery 12. The same components are designated by the same reference numerals used in FIG. 1.

Although the number of windings producing different induced electric voltages is two in the first embodiment of the invention, one kind of winding having a certain number of turns is used to which the saturated reactor and the rectifier are connected in the second embodiment, thereby further reducing the number of production steps and hence production cost, though the approximation of an approximate output curve to the maximum output curve may be degraded.

INDUSTRIAL APPLICABILITY

The electric power generating apparatus 2 for dispersed power supply according to the invention can be economically produced by eliminating an anemometer and an expensive PWM converter and reducing kinds of windings in the permanent magnet type electric power generator 3 and reactor, and can increase an annual electric power generation because of no need of stand-by electric power which is required with the PWM converter, whereby the apparatus according to the invention becomes very useful from a practical view point.

Although the case utilizing the force of wind is described in the above embodiments, it will be apparent that the apparatus according to the invention is also applicable to a use of hydraulic power or water energy in the case that if the shape of a waterwheel is determined, the number of revolutions to output characteristic is primarily determined for obtaining the maximum output.

The invention claimed is:

1. A low cost electric power generating apparatus for decentralized power supply, consisting essentially of
   a permanent magnet type electric power generator driven by revolutions of a windmill or a waterwheel,
   said power generator comprising a first insulated winding and a second insulated winding,
   said first winding having a smaller number of turns than said second winding,
   said first winding producing a lower induced voltage than said second winding due to said smaller number of turns, said first winding being connected to a first rectifier which rectifies an alternating current power input from said first winding to a direct current power output of the first rectifier, said second winding being connected in series to a saturated reactor, said reactor comprising a core that becomes saturated as alternating current power input from said second winding to said core is increased to exceed a certain value, and then the inductance value of the reactor decreases gradually as the alternating current power input to said core from said second winding increases, said saturated reactor being connected to a second rectifier which rectifies an alternating current power input from such saturated reactor to a direct current power output of the second rectifier, and the direct current power outputs of said first rectifier and said second rectifier being connected in parallel, so that when the number of the revolutions is below a specified value, output from the second winding is used, and when the number of the revolutions exceeds said specified value, output from the first winding and output from the second winding are used, and a total output from the first winding and the second winding is approximately equal to the maximum output curve relative to the number of the revolutions.

2. An electric power generating apparatus according to claim 1, further consisting essentially of a constant-voltage power supply to which the direct current power outputs of said first rectifier and said second rectifier are connected, and wherein the constant-voltage power supply is charged by said direct current power outputs.

3. An electric power generating apparatus according to claim 2, wherein the constant-voltage power supply is a battery.

4. A low cost electric power generating apparatus for decentralized power supply, consisting essentially of a permanent magnet type electric power generator driven by revolutions of a windmill or a waterwheel, said power generator comprising a first insulated winding and a second insulated winding, said first winding having a smaller number of turns than said second winding, said first winding producing a lower induced voltage than said second winding due to said smaller number of turns, said first winding being connected to a first rectifier which rectifies an alternating current power input from said first winding to a direct current power output of the first rectifier, said second winding being connected in series to a saturated reactor, said reactor comprising a core that becomes saturated as alternating current power input from said second winding to said core is increased to exceed a certain value, and then the inductance value of the reactor decreases gradually as the alternating current power input to said core from said second winding increases, said saturated reactor being connected to a second rectifier which rectifies an alternating current power input from such saturated reactor to a direct current power output of the second rectifier, and the direct current power outputs of said first rectifier and said second rectifier being connected in parallel, so that when the number of the revolutions is below a specified value, output from the second winding is used, and when the number of the revolutions exceeds said specified value, output from the first winding and output from the second winding are used, and a total output from the first winding and the second winding is approximately equal to the maximum output curve relative to the number of the revolutions, said electric power generating apparatus being devoid of any anemometer.

5. An electric power generating apparatus according to claim 4, further consisting essentially of a constant-voltage power supply to which the direct current power outputs of said first rectifier and said second rectifier are connected, and wherein the constant-voltage power supply is charged by said direct current power outputs.

6. An electric power generating apparatus according to claim 5, wherein the constant-voltage power supply is a battery.

7. A low cost electric power generating apparatus for decentralized power supply, consisting essentially of a permanent magnet type electric power generator driven by revolutions of a windmill or a waterwheel, said power generator comprising a first insulated winding and a second insulated winding, said first winding having a smaller number of turns than said second winding, said first winding producing a lower induced voltage than said second winding due to said smaller number of turns, said first winding being connected to a first rectifier which rectifies an alternating current power input from said first winding to a direct current power output of the first rectifier, said second winding being connected in series to a saturated reactor, said reactor comprising a core that becomes saturated as alternating current power input from said second winding to said core is increased to exceed a certain value, and then the inductance value of the reactor decreases gradually as the alternating current power input to said core from said second winding increases, said saturated reactor being connected to a second rectifier which rectifies an alternating current power input from such saturated reactor to a direct current power output of the second rectifier, and the direct current power outputs of said first rectifier and said second rectifier being connected in parallel, so that when the number of the revolutions is below a specified value, output from the second winding is used, and when the number of the revolutions exceeds said specified value, output from the first winding and output from the second winding are used, and a total output from the first winding and the second winding is approximately equal to the maximum output curve relative to the number of the revolutions, said electric power generating apparatus being devoid of any pulse width modulation converter.

8. An electric power generating apparatus according to claim 7, wherein said electric power generating apparatus is devoid of any anemometer.

9. An electric power generating apparatus according to claim 7, further consisting essentially of a constant-voltage power supply to which the direct current power outputs of said first rectifier and said second rectifier are connected, and wherein the constant-voltage power supply is charged by said direct current power outputs.

10. An electric power generating apparatus according to claim 9, wherein the constant-voltage power supply is a battery.

11. An electric power generating apparatus according to claim 8, further consisting essentially of a constant-voltage power supply to which the direct current power outputs of said first rectifier and said second rectifier are connected, and wherein the constant-voltage power supply is charged by said direct current power outputs.

12. An electric power generating apparatus according to claim 11, wherein the constant-voltage power supply is a battery.

13. A low cost electric power generating apparatus for decentralized power supply, comprising:
   a permanent magnet type electric power generator driven by revolutions of a windmill or a waterwheel,
   said power generator comprising exactly two insulated windings,
   said power generator comprising exactly one saturated reactor;
   a first one of said windings having a smaller number of turns than a second one of said windings,
   said first winding producing a lower induced voltage than said second winding due to said smaller number of turns,
   said first winding being connected to a first rectifier which rectifies an alternating current power input from said first winding to a direct current power output of the first rectifier,
   said second winding being connected in series to said saturated reactor, said reactor comprising a core that becomes saturated as alternating current power input from said second winding to said core is increased to exceed a certain value, and then the inductance value of the reactor decreases gradually as the alternating current power input to said core from said second winding increases,
   said saturated reactor being connected to a second rectifier which rectifies an alternating current power input from such saturated reactor to a direct current power output of the second rectifier, and
   the direct current power outputs of said first rectifier and said second rectifier being connected in parallel, so that when the number of the revolutions is below a specified value, output from the second winding is used, and when the number of the revolutions exceeds said specified value, output from the first winding and output from the second winding are used, and a total output from the first winding and the second winding is approximately equal to the maximum output curve relative to the number of the revolutions.

14. An electric power generating apparatus according to claim 13, wherein said electric power generating apparatus is devoid of any anemometer.

15. An electric: power generating apparatus according to claim 13, wherein said electric power generating apparatus is devoid of any pulse width modulation converter.

16. An electric power generating apparatus according to claim 14, wherein said electric power generating apparatus is devoid of any pulse width modulation converter.

17. An electric power generating apparatus according to claim 13, further comprising a constant-voltage power supply to which the direct current power outputs of said first rectifier and said second rectifier are connected, and wherein the constant-voltage power supply is charged by said direct current power outputs.

18. An electric power generating apparatus according to claim 14, wherein the constant-voltage power supply is a battery.

19. An electric power generating apparatus according to claim 16, further comprising a constant-voltage power supply to which the direct current power outputs of said first rectifier and said second rectifier are connected, and wherein the constant-voltage power supply is charged by said direct current power outputs.

20. An electric power generating apparatus according to claim 16, wherein the constant-voltage power supply is a battery.

* * * * *